United States Patent
Malherbe et al.

(10) Patent No.: US 6,362,671 B2
(45) Date of Patent: Mar. 26, 2002

(54) DEVICE FOR THE REGENERATION OF A CLOCK SIGNAL

(75) Inventors: Alexandre Malherbe, Trets; Fabrice Marinet, Chateauneuf le Rouge; Alain Pomet, Rousset, all of (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 09/771,364

(22) Filed: Jan. 26, 2001

(30) Foreign Application Priority Data

Jan. 27, 2000 (FR) .............................. 0001061

(51) Int. Cl.[7] .............................................. H03K 5/01
(52) U.S. Cl. ...................................... 327/165; 327/166
(58) Field of Search ................................ 327/151, 160, 327/165, 166, 167, 299; 331/2, 14, 25, 57; 375/374, 375; 377/118

(56) References Cited

U.S. PATENT DOCUMENTS

| | | | |
|---|---|---|---|
| 5,282,223 A | * 1/1994 | Muramatsu | 375/4 |
| 5,420,546 A | * 5/1995 | Watanabe et al. | 331/57 |
| 5,887,028 A | * 3/1999 | Araki | 375/224 |
| 5,889,436 A | 3/1999 | Yeung et al. | 331/2 |
| 5,920,211 A | 7/1999 | Anderson et al. | 327/116 |
| 5,970,110 A | 10/1999 | Li | 377/48 |
| 6,233,205 B1 | * 5/2001 | Wells et al. | 331/57 |
| 6,285,261 B1 | * 9/2001 | Pax et al. | 331/25 |

* cited by examiner

Primary Examiner—Terry D. Cunningham
Assistant Examiner—Linh Nguyen
(74) Attorney, Agent, or Firm—Lisa K. Jorgenson; Allen, Dyer, Doppelt, Milbrath & Gilchrist, P.A.

(57) ABSTRACT

A device for the regeneration of a clock signal from an external serial bus includes a ring oscillator and counter. The ring oscillator provides n phases of a clock signal. Of these n phases, one phase is used as a reference and is applied to the counter. It is thus possible to count the number of entire reference clock signal periods between a first pulse and a second pulse received from the bus. In reading the state of the phases in the oscillator upon reception of the second pulse, a determination is made for a current phase corresponding to the phase delay between the reference clock signal and the second pulse of the bus. By using a regeneration device that also includes a ring oscillator and a counter, it is possible to regenerate the clock signal of the bus with high precision.

39 Claims, 5 Drawing Sheets

DEVICE FOR THE REGENERATION OF A CLOCK SIGNAL

FIELD OF THE INVENTION

The present invention relates to the field of electronics, and, more particularly, to a device for the regeneration of a clock signal. The device may be used for exchanging data via a universal serial bus (USB).

BACKGROUND OF THE INVENTION

According to a USB (user serial bus), the USB clock signal is not transmitted on the bus. Only some synchronization bits are sent at the beginning of transmission so that the devices connected to this bus can get synchronized for sending or receiving data on this bus.

In systems using a data transmission protocol of this kind, the integrated circuits usually and quite conventionally comprise a circuit for the generation of a synchronous clock signal based on a phase-locked loop and a quartz crystal.

SUMMARY OF THE INVENTION

The invention is concerned with a system comprising smart-card type portable carriers. Portable carriers of this kind cannot incorporate a prior art synchronized clock signal generation circuit because it is not possible to integrate either the quartz or the phase-locked loop therein, as these elements take up a great deal of space. The invention therefore relates to a device for the regeneration of the clock signal of the bus from a few external synchronization pulses, e.g., from at least two of them.

In the example of a USB serial bus, the regeneration of a USB clock signal must have high precision. The precision must be to within about 1%. According to the invention, to measure the clock signal period of the bus, a ring oscillator is used. This ring oscillator gives n phases of a clock signal. The invention uses one phase among these n phases as a reference clock signal applied to a counter. This is done to count the number of entire reference clock signal periods between two pulses of the bus. The state of the n phases is read to obtain the current phase whose leading edge coincides with the second pulse of the bus.

This corresponds to the measurement of the delay between the reference clock signal and the second pulse of the bus. Through these two measurements, it is possible to regenerate the clock signal of the bus by the application of these two measurements to a regeneration stage comprising a ring oscillator and counting means identical to those used for the acquisition.

A device for the regeneration of the clock signal of the bus according to the invention thus comprises an acquisition stage and a regeneration stage, each comprising a ring oscillator and counting means. The acquisition stage is used to measure the number of entire reference clock periods between two successive pulses of the serial bus and the current phase of the reference clock signal on the second pulse. The regeneration stage uses the measurements of the acquisition stage to generate a pulse at output by a ring oscillator and identical counting means.

The invention therefore relates to a device for the regeneration of the clock signal of an external serial bus in an integrated circuit, comprising a stage for the acquisition of the period of the clock signal of the bus comprising a ring oscillator, counting means and means for the reading of a current phase. The ring oscillator provides at an output n phases of a clock signal.

A phase is applied as a reference clock signal to the counting means to count the number of entire reference clock signal periods between a first pulse and a second pulse of the bus. The means for the reading of the current phase is activated by the second pulse. The current phase corresponds to the measurement of the phase delay between the reference clock signal and this second pulse.

The regeneration device furthermore comprises a regeneration stage comprising a ring oscillator and counting means identical to those of the acquisition stage for reproducing the number of pulses counted and the current acquisition phase, and to control a pulse generator giving a regenerated clock signal at an output.

BRIEF DESCRIPTION OF THE DRAWINGS

Other features and advantages of the invention are described in detail in the following description given by way of a non-restrictive indication and with reference to the appended drawings, of which.

DETAILED DESCRIPTION OF THE PREFERRED EMBODIMENTS

The present invention is more particularly described within the framework of an application to an integrated circuit carrying out transactions with other integrated circuits by a USB serial bus, but its use is not limited to this application. This bus in practice takes the form of two differential lines connected in each integrated circuit to a sender and a receiver.

According to the protocol associated with such a bus, when a transaction is initiated, there is a first transitional phase during which the voltage of one of the differential lines rises while the voltage in the other line remains at zero. Then the transaction starts. According to the USB protocol, synchronization bits are first sent by the system manager of the bus which has received a transaction request. Then, the circuit initiating the transaction sends its data.

Figure 1:
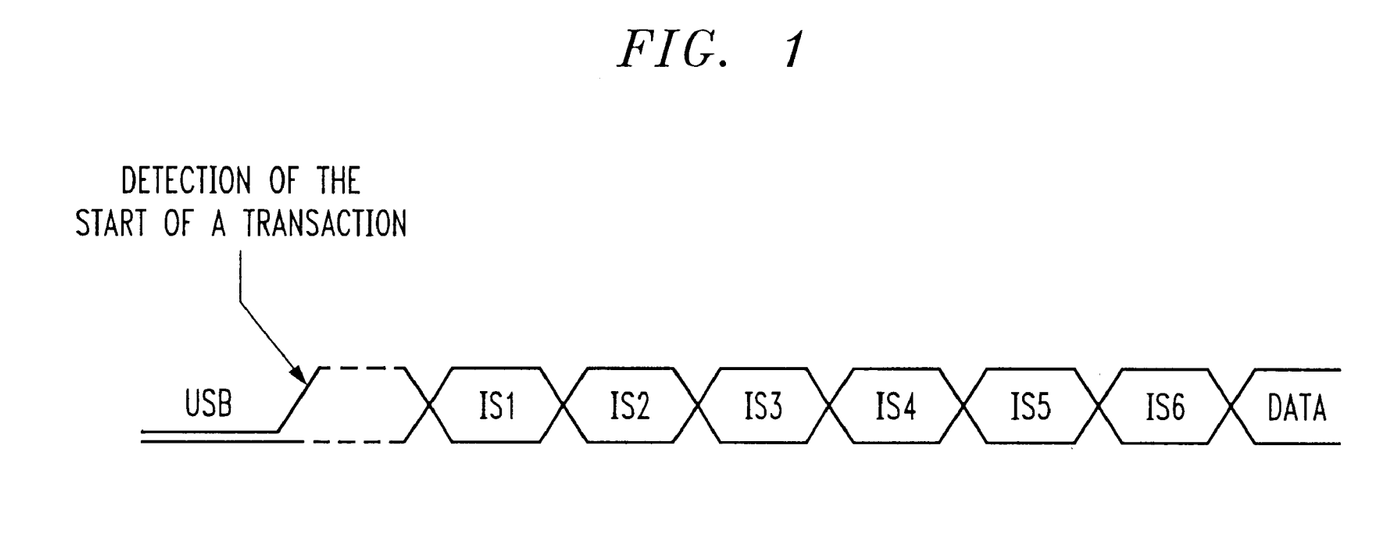
FIG. 1 shows a signal received by an integrated circuit via an external serial bus for which it is sought to regenerate the clock signal internally according to the present invention.

FIG. 1 shows an exemplary start of a transaction on a USB type serial bus, with a transitional phase and the beginning of the transaction. The example shows six synchronization pulses IS1 to IS6 and then a sequence of logic data elements DATA transmitted by the integrated circuit which has initiated the transaction.

As soon as the receiver of an integrated circuit concerned by the transaction detects a difference in voltage between the differential lines d+ and d− of the bus, the integrated circuits start a transaction initializing procedure. The integrated circuit must get ready to receive the synchronization bits, typically six bits for a USB bus, for the internal regeneration of the USB clock signal by which it will be able to receive and/or send data elements.

According to the invention, the regeneration device uses two ring oscillators. Thus, the initializing phase following the phase of detection of a beginning of a transaction comprises especially the putting into operation of these oscillators. When this initialization phase is ended, the regeneration device according to the invention is ready. According to the invention, it can measure the clock signal of the bus from the first two synchronization bits received from the USB bus. The other pulses that are then received are used to update the measurements and resynchronize the device.

Figure 2:
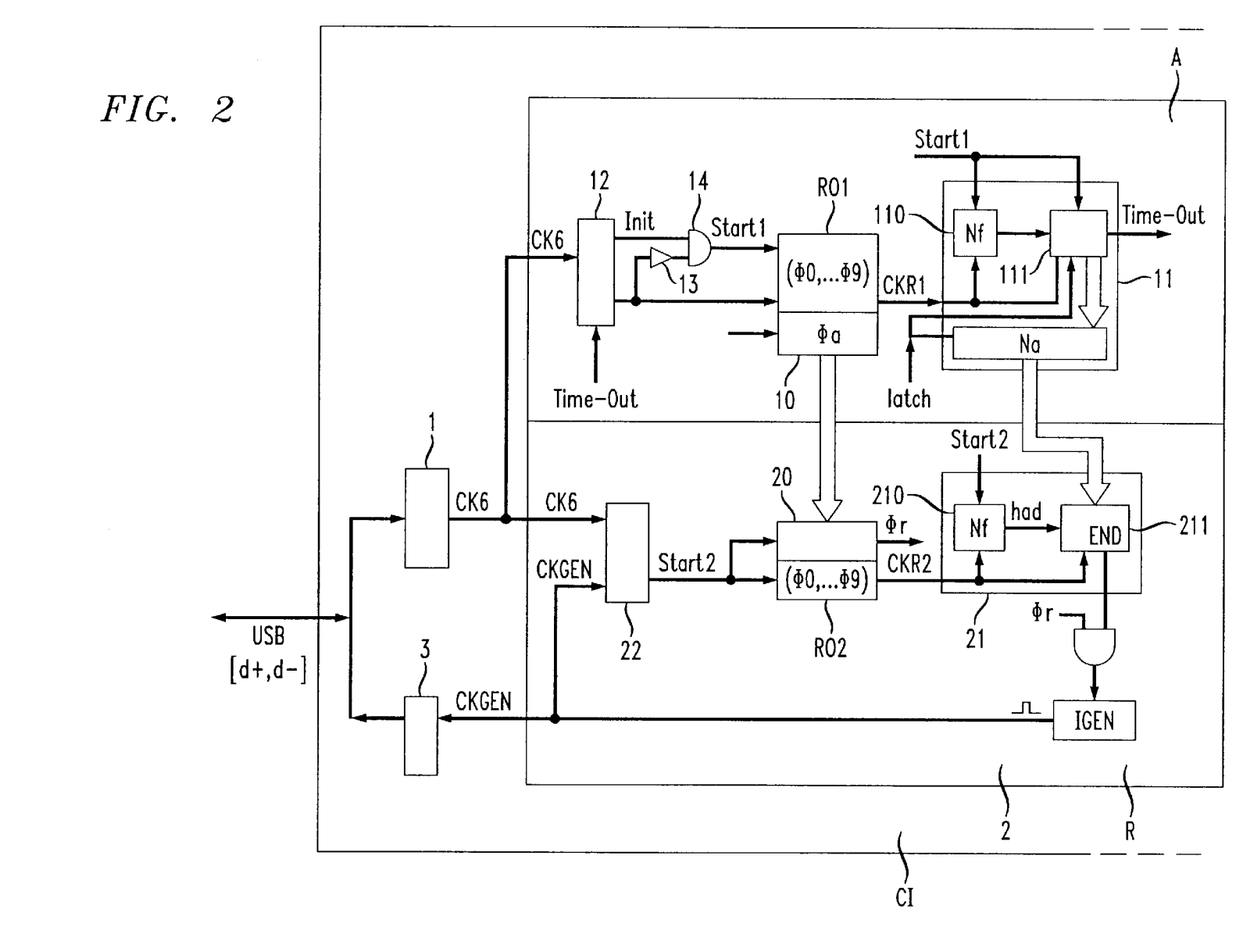
FIG. 2 shows a general block diagram of a device for the regeneration of a synchronized clock signal according to an embodiment of the present invention.

An integrated circuit comprising a regeneration circuit according to the invention is shown in FIG. 2. In the integrated circuit CI, after reshaping in an input circuit 1 of the signals received from the differential lines d+ and d− of the USB bus, a signal referenced CK6 is obtained. On this signal, therefore, the synchronization pulses IS1 to IS6 are received, and then a sequence of 0s and 1s corresponding to the data is transmitted at the frequency of the USB clock signal. This signal CK6 is applied to the input of the regeneration device 2 according to the invention. This device provides at an output a regenerated clock signal CKGEN that is applied to a data output stage 3 on the serial bus USB.

The regeneration device 2 according to the invention comprises an acquisition stage A and a regeneration stage R working in parallel. The regeneration stage uses at each new regeneration cycle the data given by the acquisition stage.

The acquisition stage A comprises a ring oscillator R01, and means 10 of acquisition and storage of the current phase Φa of the reference clock signal given by the ring oscillator. The acquisition stage further comprises counting means 11, means for the storage of the number Na of the periods of the reference clock signal, and means 12 for the sequencing of the acquisition stage.

Figure 5:
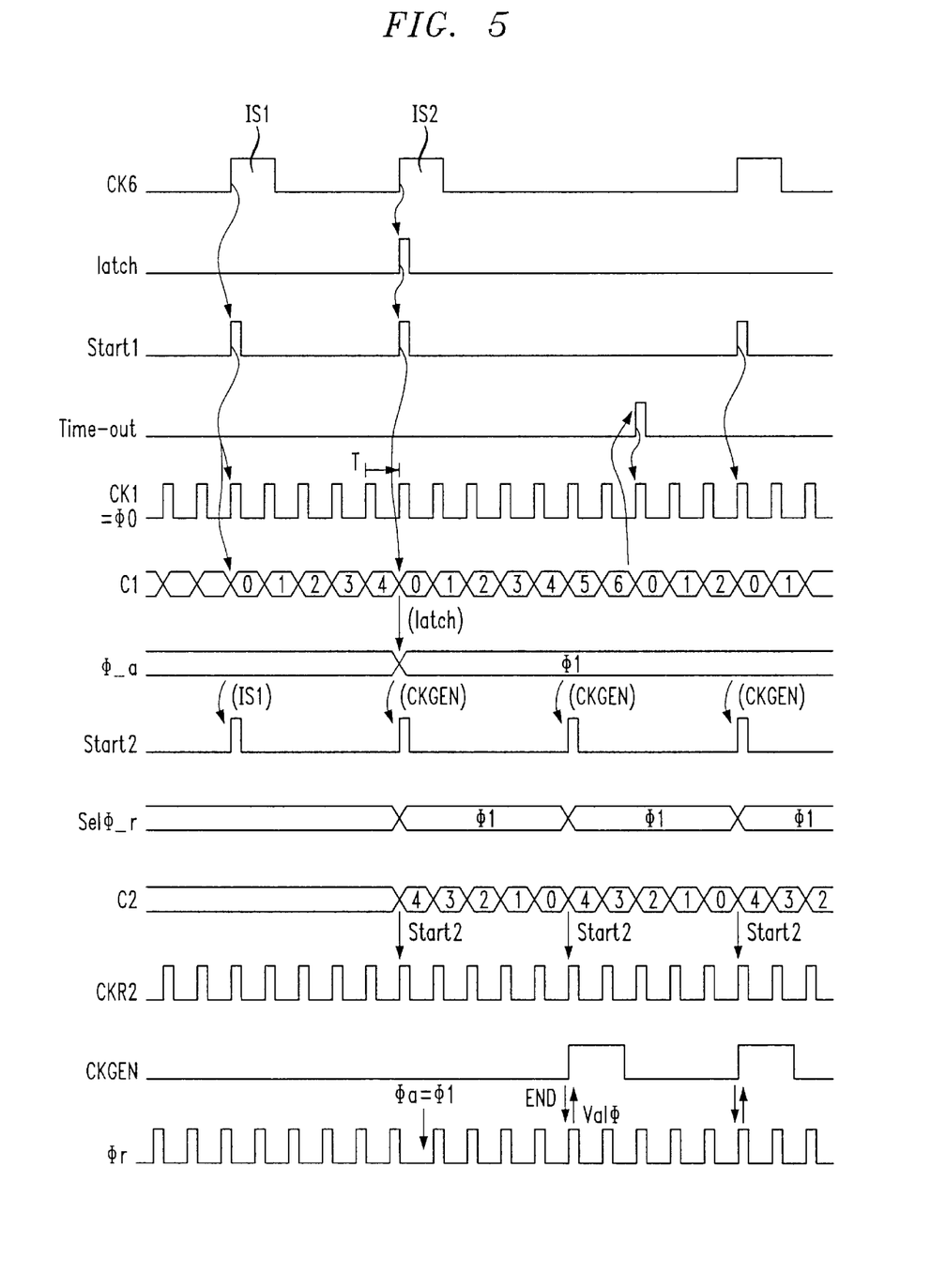
FIG. 5 is a timing diagram of the different signals of the diagram of FIG. 2 in an example of sequencing according to the present invention.

If we refer to the exemplary sequencing operation shown in the timing diagram of FIG. 5, this acquisition stage A is initialized at each signal CK6 pulse received from the serial bus. More precisely, in the example shown, after the detection of a start of transaction, the first synchronization pulse IS1 on CK6 causes the activation of an initialization signal Init of an acquisition cycle.

This signal Init is applied as an initialization signal Start1 of the ring oscillator R1 and the counting means 11. Thus, the ring oscillator is synchronized with the signal CK6 pulse. This provides for the counting, in the counting means 11, of the number of entire clock reference periods following this first signal CK6 pulse.

When the second synchronization pulse IS2 is received, the sequencing means activate a latch control signal which activates the acquisition and storage of the current phase Φa in the oscillator RO1 and of the number Na of pulses counted between the two pulses of CK6. This latch control signal then launches the initializing of the ring oscillator and the counting means for a new acquisition cycle. FIG. 2 shows that the latch control signal is applied as an initialization signal Start1 through a gate 13. Thus, the initialization signal Start1 is activated with a small delay on the latch signal. This delay is equal to the time taken for carrying out the acquisition and storage of the data elements Φa and Na.

When the synchronization pulses of CK6 have all been received, pulses of CK6 are received at variable time intervals greater than a clock signal period of the bus as a function of the sequence of the data transmitted. In this case, the data elements acquired between two of these pulses are not right. Thus, in the invention, it is planned to activate the acquisition and data storage means Φa and Na only if the two CK6 pulses that sandwich the acquisition cycle correspond to a clock period.

This can be done simply, for example by appropriately sizing the counting means at a maximum predetermined number so that, when this limit is reached, the counting means activate a signal indicating the crossing of this limit. This limit-crossing signal, referenced Time-out in FIG. 2, could also be sent by a watchdog type circuit reset at each initialization of the acquisition step.

The sequencing means 12 of the acquisition stage are obtained in practice by state machines to appropriately generate the Init and latch control signals as a function of the signal CK6 and the signal Time-out. In the example, the Init and latch signals are each applied as an initialization signal Start1 by an OR type logic gate 14.

In practice, the counting means 11 may include two counters 110 and 111. The first counter 110 counts a predetermined fixed number Nf. When this count is achieved, it activates the counting in the second counter 111. The data element Na corresponding to the measurement is then that of the second counter and is used to initialize a corresponding counter in the regeneration stage. This data element Na is stored in a register 11a upon the activation of the latch command applied to the counter 111.

The regeneration stage includes a ring oscillator RO2, and means 20 for reading the phase Φa memorized in the acquisition stage and for the selection of the corresponding phase Φr in the oscillator RO2. The regeneration stage further includes means 21 for counting the number Na given by the acquisition stage and means 22 for initializing each new regeneration cycle. The ring oscillator RO2 is structurally identical to that of the acquisition phase. At output, it gives a reference clock signal CKR2 used to regenerate the clock signal of the bus.

The counting means 21 receive this reference clock signal CKR2 to count the number Na given by the acquisition stage R. When this count is reached, it activates an end-of-count signal END at output, which is applied as an enabling signal Val_Φ for the selection of the current phase Φr of the reference clock signal CK2. The appearance of the pulse on this phase then activates a pulse generator IGEN which gives the regenerated clock signal CKGEN at an output.

The sequencing means 22 of the regeneration stage have the function of resetting the oscillator RO2 and the counting means 21 at each new regeneration cycle. The first regeneration cycle is activated by the appearance of the first pulse IS1 of CK6.

The following cycles are, for example, activated by each of the pulses of the regenerated clock signal CKGEN. In a more complicated sequencing, it would be possible to take account of the pulses of this regenerated clock signal CKGEN by default or else the pulses of CK6 when these pulses are received. In any case, at each new regeneration cycle, a new reading of the data elements Φa and Na given by the acquisition stage is launched so that, at each regeneration cycle, the most recent data elements are used.

It has been seen here above that the counting means are identical in both stages, so that the clock signal of the bus can be regenerated with precision. Should the counting means 11 of the acquisition stage be formed by two counters 110 and 111, the counting means 21 of the regeneration stage are also formed by two counters. The first counter 210 is identical to that of the acquisition stage to count a fixed number Nf of reference clock pulses. The second counter 211 is identical to that of the acquisition stage to count the variable number Na. In the example, this second counter 211 is used as a countdown unit. It is activated by the first counter 210 when it has reached its count Nf.

It will clearly be understood that the regeneration device according to the invention is based on the identity of the circuits used, firstly, for the acquisition and, secondly, for the regeneration, these circuits being used in the acquisition stage to measure the data elements Φa and Na, these same circuits being used in the restitution stage for the restitution at output of the signal corresponding to these measurements.

Figure 3:
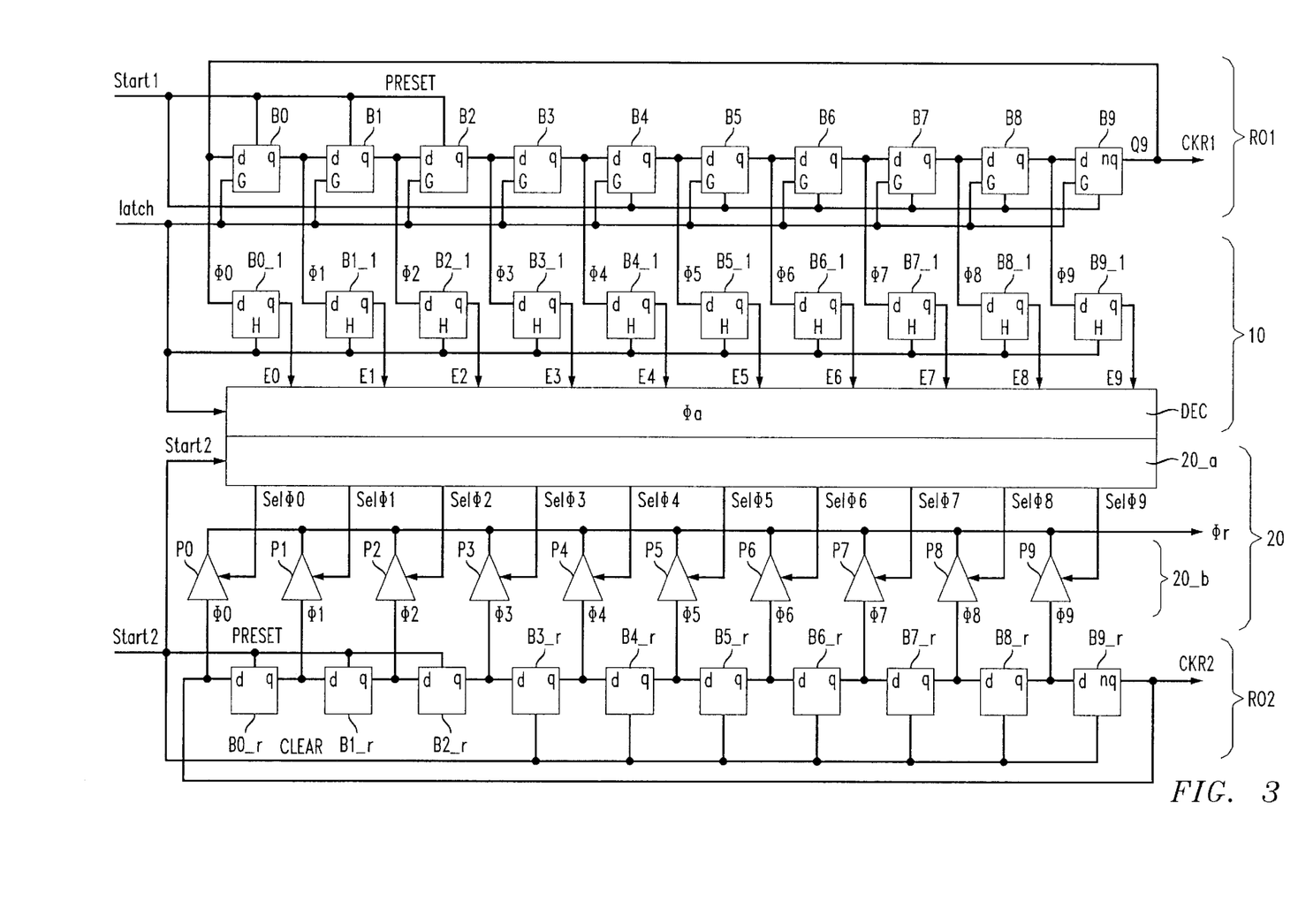
FIG. 3 is a detailed diagram of the oscillators with the storage and phase selection circuits according to the present invention.

FIG. 3 gives a detailed view of the ring oscillators of the acquisition and regeneration stages with the means 10 of acquisition and storage and the current phase Φa reading and selecting means 20. In the example the ring oscillator RO1 has ten D-type, series-connected latches B0 to B9. The output Q9 of the last latch give the reference clock signal CKR1 and is looped to the input of the first latch B0.

In the example, the nine first latches B0 to B8 are such that their Q output is applied to the input of the next latch. The tenth latch B9 is such that its output nq is applied as an output signal and at input of the latch B0. However, these ten latches are structurally identical so that they impose exactly the same delay between the input d and their output q (B0 to B8) or nq (B9). This is obtained in practice in a well-known manner by reversing the transfer control signals in the "nq" latch with respect to the "q" latches.

The signal Startl for initializing an acquisition cycle is applied to force the starting conditions of the ring oscillator R01. In the example, it is applied to an input Preset for presetting the first three latches B0 to B2 and to an input Clear for clearing the other latches.

The signal latch for its part is applied to the latches B0 to B9 of the oscillator to stop them for the period of time taken for the storage, in the other latches B0_1 to B9_1, of the state of their inputs D0 to D9. These latches B0_1 to B9_1 of the acquisition and storage means 10 of the current phase Φa are of the D latch circuit type with edge activation. In the example, the passage from 0 to 1 of the latch signal activates the storage, in these flip-flops, of the input applied to them. The output of these latches B0_1 to B9_1 is applied to the inputs E0 to E9 of a circuit DEC capable of giving, at output, an information element on phase measurement. This is namely information determining a latch input, among the ten latch inputs of the ring oscillator, corresponding to the current phase Φa of the clock signal of the reference CKR1 at the time of reception of a pulse of CK6.

Figure 4:
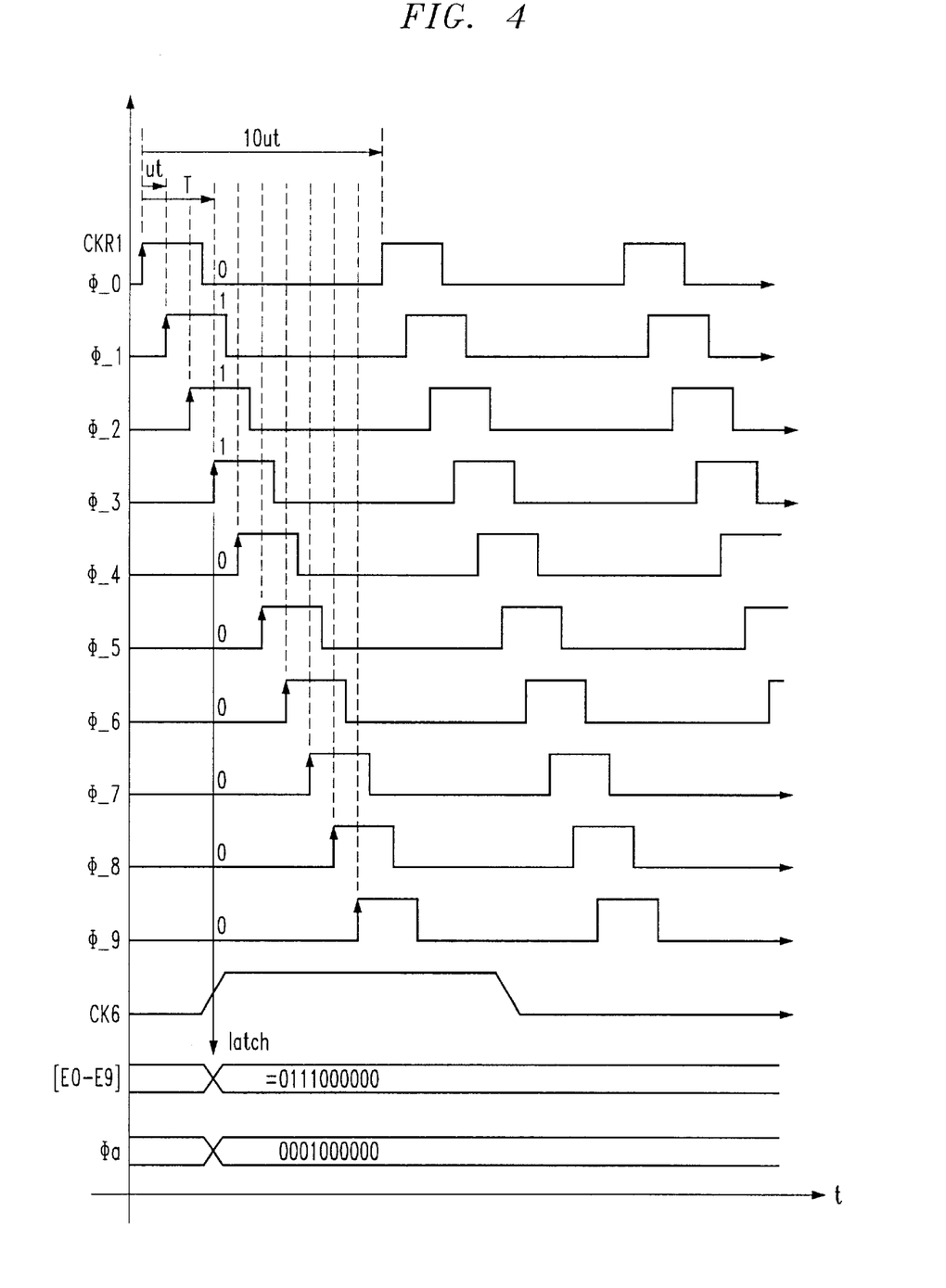
FIG. 4 is a detailed description of the principle of acquisition of the current phase in the oscillator of the acquisition stage according to the present invention.

The principle of acquisition of the current phase is illustrated in FIG. 4. The ring oscillator gives n phases of a clock signal, one per latch input. In the example, n=10. We therefore have the phases Φ0 to Φ9. In the example, the phase Φ0 is taken as the reference phase to be used as a reference clock signal CKR1 applied to the counting means. Thus, in the example, when the ring oscillator and the counting means are initialized, at output, there is obtained the leading edge of a pulse on the phase Φ0. From which the counting means can count a number of entire periods of the reference clock signal.

The n phases of the oscillator are phase-shifted with respect to each other by the delay ut of the latch, which is the same in each latch. If the ring oscillator is sized so that this delay ut is equal to 1 nanosecond, ten phases signals with a period of 10 ns are obtained, phase-shifted from each other by 1 ns.

Referring to FIGS. 4 and 5, the first acquisition cycle is activated by the reception of the first pulse IS1 of CK6. The principle of acquisition according to the invention includes synchronizing the phase Φ0 used as the reference clock signal CKR1 on this pulse IS1. This is obtained by setting the initialization (Startl) of the oscillator RO1 and the counting means 11 upon reception of the pulse IS1. It has been seen that, at output, a leading pulse edge is obtained on Φ0. Starting from this leading edge, the counting means will start counting a number of entire periods of CKR1.

When the second pulse IS2 is received, the signal latch is activated and stops the oscillator and the counting means. The number Na of pulses counted is loaded into a storage register along with the state of the inputs of the latches B0 to B9, making it possible to deduce the phase delay between the last pulse of the reference pulse Φ0 and the pulse IS2 of CK6.

This delay corresponds to the measurement, in the time unit ut, of the time interval T between the last pulse of CKR1=ΦD and the pulse IS2 of CK6, namely in the example a measurement of this time unit to within 1 nanosecond. This delay corresponds to the identification of the current phase, namely the phase with which the pulse of CK6 corresponds to a leading edge. This is what is called the measurement of the current phase.

What has to be done then, in the regeneration stage, is to select this phase to reproduce the time interval to be allowed to elapse after the counting of the number Na of pulses before regenerating the pulse CKGEN. For this purpose, the ring oscillator RO2 of the regeneration stage has to be strictly identical to the ring oscillator RO1 of the acquisition stage.

The oscillator RO2 in the example has ten D type latches B0_r to B9_r, in series. The output Q9 of the last latch gives the reference clock signal CKR2 and is applied to the input of the first latch B0_r (FIG. 3). The signal Start2 is applied to these latches to force precisely the same initialization conditions (Preset, Clear) as in the ring oscillator RO1.

The read means 20 of the phase to be selected in the ring oscillator RO2 comprises a logic circuit 20_a to transmit the phase selection information Sel_Φ=[Sel_Φ0, Sel_1, ..., Sel_Φ9] on a circuit 20_b of controlled gates. This transmission is done upon activation of the signal Start2. The phase selection information Sel Φis such that only one bit is at 1 for the selection of only one latch input of the ring oscillator RO2 as the phase output Φr. All the other bits are at zero.

The controlled gate circuit 20_b comprises one gate per latch of the oscillator RO2, i.e., in the example, there are ten controlled gates P0, ..., P9. Each of these gates is connected between the input of the associated latch and the phase output Φr. This phase output Φr is applied to the pulse generation circuit IGEN when the end-of-count signal END of the means 21 is activated.

With a device according to the invention, it is possible, in practice, to regenerate the clock of the bus and to do so with high precision. This device is more particularly applicable in the integrated circuits of smart-card type portable carriers, but also can be used more generally.

That which is claimed is:

1. A device in an integrated circuit for regenerating a clock signal from a serial bus and comprising:
   an acquisition stage connected to the serial bus for acquiring a period of the clock signal, said acquisition stage comprising
      a ring oscillator for providing n phases of a reference clock signal,
      a counter having an input for receiving at least one of the n phases for counting reference clock signal periods between a first pulse and a second pulse of the serial bus, and means for reading a current phase corresponding to measurement of a phase delay between the reference clock signal and the second pulse, said means for reading the current phase being activated by the second pulse;

a regeneration stage connected to said acquisition stage for reproducing the reference clock signal periods counted and the current phase; and a pulse generator connected to said regeneration stage and being controlled thereby for providing the regenerated clock signal.

2. A device according to claim 1, wherein said regeneration stage comprises a ring oscillator and a counter connected thereto, and said ring oscillator and said counter being identical to those of said acquisition stage.

3. A device according to claim 1, wherein said acquisition stage comprises means for re-initializing said ring oscillator and said counter for synchronizing an acquisition cycle on each pulse of the serial bus.

4. A device according to claim 3, wherein said re-initializing means activates a first control signal on reception of a first pulse which activates the re-initialization, and wherein a second control signal is activated for storing the current phase and the reference clock signal periods counted, and then activate the re-initialization.

5. A device according to claim 1, wherein said regeneration stage comprises re-initialization means to re-initialize said ring oscillator and said counter upon reception of at least one pulse from the serial bus and the regenerated clock signal.

6. A device according to claim 5, wherein said regeneration stage comprises re-initializing means to re-initialize said ring oscillator and said counter upon reception of the first pulse of the serial bus, and of each regenerated clock signal pulse.

7. A device according to claim 1, wherein the current phase and the reference clock signal periods counted by said acquisition stage are read by said regeneration stage at each re-initialization.

8. A device according to claim 2, wherein said regeneration stage comprises:

means for selecting the current phase; and a phase-controlled gate of said ring oscillator for selecting one phase among the n phases corresponding to the current phase.

9. A device according to claim 2, wherein said counter of said acquisition and regeneration stages each comprise two counters, a first counter for counting a fixed number of reference clock strokes and a second counter for count a variable number of reference clock strokes.

10. A device according to claim 9, wherein said second counter of said regeneration stage is used as a countdown unit and a passage to zero of said second counter activates a control signal being applied as an enabling signal for selection of the current phase in said ring oscillator.

11. A device according to claim 3, wherein said acquisition stage is re-initialized at an end of a time period after reception of each pulse of the serial bus if no other pulse of the serial bus has followed in this time period.

12. A device according to claim 11, wherein the time period is given by said counter of said acquisition stage after counting a predetermined maximum number of the reference clock signal periods.

13. A device according to claim 11, further comprising a watchdog reset circuit; and wherein the time period is provided by said watchdog reset at each new pulse of the serial bus.

14. A device according to claim 1, wherein the serial bus interface is a universal serial bus (USB) interface.

15. An integrated circuit comprising:

a serial bus interface; and an acquisition stage connected to said serial bus interface for acquiring a period of the clock signal, said acquisition stage comprising a ring oscillator for providing n phases of a reference clock signal, a counter having an input for receiving at least one of the n phases for counting reference clock signal periods between a first pulse and a second pulse of the serial bus, and a read circuit for reading a current phase corresponding to measurement of a phase delay between the reference clock signal and the second pulse, said read circuit being activated by the second pulse;

a regeneration stage connected to said acquisition stage for reproducing the reference clock signal periods counted and the current phase; and a pulse generator connected to said regeneration stage and being controlled thereby for providing a regenerated clock signal.

16. An integrated circuit according to claim 15, wherein said regeneration stage comprises a ring oscillator and a counter connected thereto, and said ring oscillator and said counter being identical to those of said acquisition stage.

17. An integrated circuit according to claim 15, wherein said acquisition stage comprises a re-initialization circuit for re-initializing said ring oscillator and said counter for synchronizing an acquisition cycle on each pulse of a serial bus.

18. An integrated circuit according to claim 17, wherein said re-initializing circuit activates a first control signal on reception of a first pulse which activates the re-initialization, and wherein a second control signal is activated for storing the current phase and the reference clock signal periods counted, and then activate the re-initialization.

19. An integrated circuit according to claim 15, wherein said regeneration stage comprises a re-initialization circuit to re-initialize said ring oscillator and said counter upon reception of at least one pulse from a serial bus and the regenerated clock signal.

20. An integrated circuit according to claim 19, wherein said regeneration stage comprises a re-initialization circuit to re-initialize said ring oscillator and said counter upon reception of the first pulse of the serial bus, and of each regenerated clock signal pulse.

21. An integrated circuit according to claim 15, wherein the current phase and the reference clock signal periods counted by said acquisition stage are read by said regeneration stage at each re-initialization.

22. An integrated circuit according to claim 16, wherein said regeneration stage comprises:

a selector for selecting the current phase; and a phase-controlled gate of said ring oscillator for selecting one phase among the n phases corresponding to the current phase.

23. An integrated circuit according to claim 16, wherein said counter of said acquisition and regeneration stages each comprise two counters, a first counter for counting a fixed number of reference clock strokes and a second counter for count a variable number of reference clock strokes.

24. An integrated circuit according to claim 23, wherein said second counter of said regeneration stage is used as a countdown unit and a passage to zero of said second counter activates a control signal being applied as an enabling signal for selection of the current phase in said ring oscillator.

25. An integrated circuit according to claim 17, wherein said acquisition stage is re-initialized at an end of a time period after reception of each pulse of the serial bus if no other pulse of the serial bus has followed in this time period.

26. An integrated circuit according to claim 25, wherein the time period is given by said counter of said acquisition stage after counting a predetermined maximum number of the reference clock signal periods.

27. An integrated circuit according to claim 25, further comprising a watchdog reset circuit; and wherein the time period is provided by said watchdog reset at each new pulse of the serial bus.

28. An integrated circuit according to claim 15, wherein said serial bus interface is a universal serial bus (USB) interface.

29. A method for regenerating a clock signal in an integrated circuit from a serial bus connected thereto, the method comprising:

acquiring a period of the clock signal by generating n phases of a reference clock signal;

counting reference clock signal periods between a first pulse and a second pulse of the serial bus based upon at least one of the n phases of the reference clock signal;

reading a current phase corresponding to measurement of a phase delay between the reference clock signal and the second pulse, the reading of the current phase being activated by the second pulse; and reproducing the reference clock signal periods counted and the current phase.

30. A method according to claim 29, wherein the acquiring, counting and reading are performed using an acquisition stage comprising:

a ring oscillator for providing the n phases of the reference clock signal;

a counter having an input for receiving at least one of the n phases for counting the reference clock signal periods between the first pulse and the second pulse of the serial bus, and a reading circuit for reading the current phase corresponding to measurement of the phase delay between the reference clock signal and the second pulse, and the reading circuit being activated by the second pulse.

31. A method according to claim 30, wherein the reproducing is performed using a regeneration stage connected to the acquisition stage, and the regeneration stage comprises a ring oscillator and a counter connected thereto.

32. A method according to claim 31, further comprising controlling a pulse generator connected to the regeneration stage for providing the regenerated clock signal.

33. A method according to claim 30, wherein the acquisition stage comprises a re-initialization circuit for re-initializing the ring oscillator and the counter for synchronizing an acquisition cycle on each pulse of the serial bus.

34. A method according to claim 33, wherein the re-initializing circuit activates a first control signal on reception of a first pulse which activates the re-initialization, and wherein a second control signal is activated for storing the current phase and the reference clock signal periods counted, and then activate the re-initialization.

35. A method according to claim 31, wherein the regeneration stage comprises a re-initialization circuit to re-initialize the ring oscillator and the counter upon reception of at least one pulse from the serial bus and the regenerated clock signal.

36. A method according to claim 35, wherein the regeneration stage comprises a re-initialization circuit to re-initialize the ring oscillator and the counter upon reception of the first pulse of the serial bus, and of each regenerated clock signal pulse.

37. A method according to claim 30, wherein the acquisition stage is re-initialized at an end of a time period after reception of each pulse of the serial bus if no other pulse of the serial bus has followed in this time period.

38. A method according to claim 37, wherein the time period is given by the counter of the acquisition stage after counting a predetermined maximum number of the reference clock signal periods.

39. A method according to claim 29, wherein the serial bus is a universal serial bus (USB).

* * * * *

UNITED STATES PATENT AND TRADEMARK OFFICE
CERTIFICATE OF CORRECTION

PATENT NO.   : 6,362,671 B2
DATED        : March 26, 2002
INVENTOR(S)  : Alexandre Malherbe, Fabrice Marinet and Alain Pomet It is certified that error appears in the above-identified patent and that said Letters Patent is hereby corrected as shown below:

Column 1,
Line 12, delete "(user serial bus)" insert -- (universal serial bus) --

Column 6,
Line 17, delete "CKR1=$\Phi$D" insert -- CKR1=$\Phi$0 --
Line 39, delete "Sel_1" insert -- Sel_$\Phi$1 --

Column 7,
Line 49, delete "for count a" insert -- for counting a --

Column 8,
Line 62, delete "count a variable" insert -- counting a variable --

Signed and Sealed this

Nineteenth Day of November, 2002

*Attest:*

*Attesting Officer*

JAMES E. ROGAN
*Director of the United States Patent and Trademark Office*